United States Patent

[11] 3,568,005

[72] Inventor Carl E. Atkins
Montclair, N.J.
[21] Appl. No. 742,912
[22] Filed July 5, 1968
[45] Patented Mar. 2, 1971
[73] Assignee Wagner Electric Corporation

[54] CONTROL CIRCUIT
8 Claims, 1 Drawing Fig.

[52] U.S. Cl. .......... 317/142, 317/146, 317/148.5, 307/116, 307/255, 307/293, 307/308
[51] Int. Cl. .......... H01h47/22, H01h 47/32
[50] Field of Search .......... 317/146, 142, 123; 307/295, 252

[56] References Cited

UNITED STATES PATENTS

| | | | |
|---|---|---|---|
| 3,435,298 | 3/1969 | Atkins et al. .......... | 317/146 |
| 2,683,767 | 7/1954 | Cunningham .......... | 174/52.6 |

FOREIGN PATENTS

| | | | |
|---|---|---|---|
| 1,050,559 | 4/1960 | France .......... | 331/68 |

*Primary Examiner*—Lee T. Hix
*Assistant Examiner*—C. L. Yates
*Attorney*—Eyre, Mann & Lucas

ABSTRACT: A first solid state switch normally shunts charging current past a timing circuit which controls the state of a second solid-state switch which normally shunts the winding of a load-controlling relay. When the input signal to the gate electrode of the first switch is altered so as to permit a bias circuit to render the first switch nonconductive, circuitry interconnecting the gate electrodes of the first and second switches causes the second switch to become nonconductive substantially concurrently with the first switch. Charging current, no longer shunted past the timing circuit, develops a voltage across a timing capacitor connected to the gate electrode of the second switch. Thus, when the first switch again becomes conductive, the second switch will remain nonconductive for an additional predetermined length of time during the discharge of the capacitor, thus prolonging the energization of the load circuit.

PATENTED MAR 2 1971
3,568,005
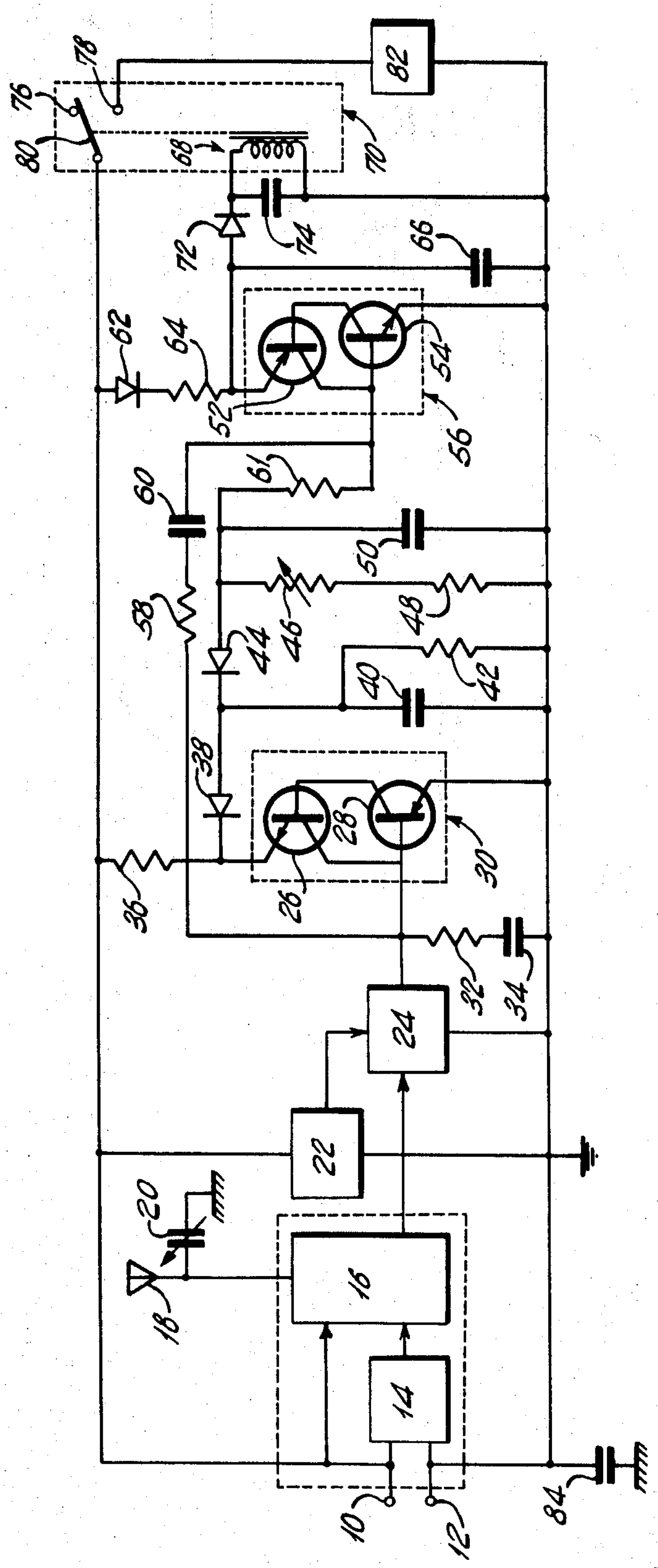
INVENTOR
CARL E. ATKINS
BY
Eyre, Mann & Lucas
ATTORNEYS

CONTROL CIRCUIT

The present invention relates to control circuitry for energizing a load substantially instantaneously upon detection of an input signal of a predetermined level and for continuing the energization of the load for a predetermined length of time after removal of the aforementioned input signal. The circuit described herein which embodies this invention is designed to operate at a low voltage, viz., 24 volts AC, and is particularly but not exclusively adapted to controlling the flow of water in a surgeon's scrub sink. In this particular application, it is desirable that the surgeon be able to control the flow of water without having to touch any manual controls. In addition, it is desirable that the surgeon be able to move away from the scrub sink for a brief period of time with out cessation of the flow of water. The present invention is designed to fulfill both of these functions.

For a better understanding of the present invention and the advantages thereof, the following detailed description should be read in connection with the accompanying drawing which schematically illustrates the various components of the circuit and their interconnections.

Input terminals 10 and 12 are connected to a voltage multiplier 14 which, when a 24 volt AC source is connected to the input terminals, produces a DC voltage of 80 to 100 volts. This DC output of voltage multiplier 14 and the 24 volt AC power are both applied to oscillator 16, which may be a capacitance responsive circuit of the type described in copending application Ser. No. 695,708, for example. Antenna 18 serves to detect the presence or absence of any person or object which would alter the capacitance to ground of the antenna, thereby effecting a decrease in the output of oscillator 16. In certain applications it may be desirable to "pot" or encapsulate in electrical insulating material the combined voltage multiplier 14 and oscillator 16 as indicated by the dashed line surrounding same because of the higher voltage developed in these circuits. Since the various components of the oscillator 16 would then be inaccessable, a variable capacitor 20 is connected between the antenna 18 and true ground external to the encapsulated portion of the circuit in order to enable sensitivity adjustments of the oscillator 16. However, it will be readily understood that the input signal could be provided by any one of a number of detection circuits. AC–DC conversion circuit 22 provides DC power to the AC amplification section 24, which serves to amplify the output of oscillator 16.

Complementary transistors 26 (NPN) and 28 (PNP) are connected in the regenerative feedback configuration to form a negative-firing switch 30, the base electrode of transistor 28 comprising the gate electrode, the emitter of transistor 26 forming the cathode, and the emitter of transistor 28 forming the anode of the switch 30. Resistor 32 and capacitor 34 are connected in series between the base and the emitter of transistor 28 and comprise a bias circuit for the switch 30. Resistor 36 is connected to the high line and in the controlled current path to limit the magnitude of current flowing through the switch 30. The cathode of diode 38 is connected to the cathode of the switch 30, and a load circuit comprising capacitor 40 and resistor 42 is connected in parallel between the anode of diode 38 and the anode of switch 30. The cathode of diode 44 is connected to the anode of diode 38. Variable resistor 46 and fixed resistor 48 are connected in series with one another and in parallel with capacitor 50, thereby forming the timing circuit which is connected between the anode of diode 44 and the ground or neutral line.

Complementary transistors 52 (PNP) and 54 (NPN) are connected in the regenerative feedback configuration to form a positive-firing switch 56, the base of transistor 54 comprising the gate electrode, the emitter of transistor 52 comprising the anode, and the emitter of transistor 54 comprising the cathode of the switch 56. Resistor 58 and capacitor 60 are connected in series between the gate electrode of switch 30 and the gate electrode of switch 56. Resistor 61 interconnects the gate electrode of switch 56 and the high side of timing capacitor 50. Diode 62 and resistor 64 are connected in series between the high line and the anode of switch 56, the anode of diode 62 being connected to the high line. Filtering capacitor 66 is connected across the anode and cathode of switch 56.

The winding 68 of relay 70 is interconnected with the anode of switch 56 by a diode 72 having its cathode connected to one terminal of winding 68, the other terminal being connected to the neutral Winding 68 is connected in parallel with a capacitor 74 which serves to maintain the required level of DC energizing current when switch 56 is nonconductive and positive half-waves of current pass through diode 72. Relay 70 further comprises contacts 76 and 78 and armature 80. A load 82 is connected between contact 78 and the neutral line. Armature 80, which is connected to the high line, closes a current path through the load when winding 68 is energized. Capacitor 84 is connected between the neutral line and true ground to provide a bypass for transients appearing on the neutral line.

The operation of the circuit shown in the drawing is as follows:

When a source of 24 volt AC power is applied between terminals 10 and 12, voltage multiplier 14 will provide an input of from 80 to 100 volts DC to the oscillator 16 which is also connected to the high line. Oscillator 16 is so adjusted that the output pulses when amplified by DC amplification section 24 are of sufficient magnitude and proper polarity (negative) to overcome the positive bias on the gate electrode of switch 30. This bias is provided by capacitor 34 which is charged by breakdown current passing through resistor 36 and across the emitter-collector junction of transistor 26 and through resistor 32 during the positive half-cycles of applied AC power. The voltage which may develop across capacitor 34 is limited by the Zener breakdown voltage of the base-emitter junction of transistor 28 (approximately 6 volts). Hence, switch 30 is normally conductive during the negative half-cycles of the power source, and will therefore shunt current from the load and timing circuitry during the negative half-cycles. During positive half-cycles, diodes 38 and 44 serve to block current from the load and timing circuits.

Switch 56 derives a firing signal from the square-wave voltage appearing at the gate electrode of switch 30 and is normally conductive during the positive half-cycles. In addition, diode 62 serves to prevent leakage current from passing across the emitter-collector junction of transistor 52, thus eliminating undesirable alteration of the biasing signal provided to the gate electrode switch 56. Diode 62 also serves to reduce the duty cycle of resistor 64, thereby reducing the heat generated during circuit operation.

The load circuitry comprising capacitor 40 and resistor 42 is necessitated by the low voltage of the power source with which the circuit is designated to be employed.

When a change in capacitance to ground is sensed by antenna 18, the magnitude of the pulses generated by oscillator 16 is reduced below the minimum valve required to overcome the positive bias of capacitor 34. Thus, switch 30 is rendered nonconductive. The square wave which appeared at the gate of switch 30 while periodically conductive no longer appears and is therefore not transmitted to the gate electrode of switch 56 through resistor 58 and capacitor 60, thereby causing the second switch 56 to be rendered nonconductive substantially concurrently with switch 30. Energizing current is no longer shunted past winding 68 during the positive half-cycles and therefore armature 80 will be moved against contact 78, thereby energizing the load 82.

Meanwhile, charging current will flow through resistor 36 and diodes 38 and 44 to capacitor 50. The voltage which may be developed across capacitor 50 is determined by the setting of variable resistor 46 and the value of fixed resistor 48. Charging of capacitor 60 takes place rapidly, the magnitude of charging current being limited only by resistor 36. The negative voltage developed across capacitor 50 is applied through resistor 61 to the gate electrode of switch 56. Thus, in the scrub sink application, once the flow of water has been initiated, by energization of load 82, the user may leave the vicinity of the sink almost immediately and still have the desired delay in cutoff of the flow of water.

When the output pulses from amplifier 24 are increased to a sufficient magnitude to overcome the bias of capacitor 34, switch 30 will again be rendered conductive and will therefore shunt current from both the load and timing circuitry. Capacitor 50 begins to discharge through resistors 46 and 48, maintaining the switch 56 nonconductive until the voltage across capacitor 50 can no longer overcome the signal derived from the gate electrode of conductive switch 30. The period for which the timing circuitry maintains switch 56 nonconductive after switch 30 is restored to its normally conductive state may be varied by varying the value of resistor 46 which controls both the level of charge and the rate of discharge of capacitor 50. When capacitor 50 has discharged sufficiently to enable switch 56 to return to its normally conductive state, energizing current will again be shunted past winding 68 of relay 70 during the positive half-cycles and load 82 will be deenergized.

The advantages of the present invention will be apparent to those skilled in the art, as well as changes which could be made in the foregoing embodiments without departing from the spirit and scope of the invention. Therefore, it should be understood that the present invention is not to be limited to the foregoing description of the specific embodiments thereof, but is to be determined by the spirit and scope of the accompanying claims.

I claim:

1. A control circuit comprising:
   1. first and second power input terminals through which power is provided to said control circuit;
   2. first switching means having input and output terminals and operative to control a first current path through said output terminals of said first switching means;
   3. second switching means having input and output terminals and operative to control a second current path through said output terminals of said second switching means;
   4. signal circuit means interconnecting said input terminals of said first and second switching means and operative to cause said second switching means to change its conductivity state substantially simultaneously with a like change of conductivity state of said first switching means in response to application of a predetermined input signal across said input terminals of said first switching means; and
   5. timing circuit means connected between said output terminals of said first switching means and said input terminals of said second switching means and, after being energized for a minimum period of time, operative for a variable predetermined period of time to maintain said second switching means in the conductivity state caused by the application of said predetermined input signal through said signal circuit means, wherein when a source of alternating current power is connected to said power input terminals and a load is connected across the output terminal of said second switching means, said control circuit is operative to change the energization state of the load during the period of application of said predetermined input signal and for said variable predetermined period of time thereafter.

?. The control circuit according to claim 1 wherein said timing circuit means comprises capacitance means, a unidirectional low impedance charging current path for said capacitance means, and a discharge path for said capacitance means including variable resistance means.

3. The control circuit according to claim 1 further including load circuit means coupled between said first switching means and said timing circuit means and operative to increase circuit efficiency when said applied alternating current power has a relatively low voltage level.

4. The control circuit according to claim 1 including rectification means in said second current path operative to prevent leakage current from altering the bias on said second switching means.

5. The control circuit according to claim 1 wherein each of said first and second switching means has an anode, a cathode, and a gate electrode, said gate electrodes being interconnected by said signal circuit means which are operative to cause said second switching means to open said second current path substantially concurrently with the opening of said first current path.

6. The control circuit according to claim 1 and further including output circuit means including rectification means having its anode connected to the anode of said second switching means, and capacitance means connected between the cathode of said rectification means and the cathode of said second switching means.

7. The control circuit according to claim 6 wherein said circuit means further includes an electromagnetic relay having a winding, an armature, and first and second contacts, said winding being connected in parallel with said capacitance means of said output circuit, and said armature being connected to one of said power input terminals.

8. The control circuit according to claim 6 and adapted for use with a low-voltage power source, said control circuit further comprising:
   1. a voltage multiplication circuit connected to said power input terminals;
   2. a variable signal generating circuit connected to said voltage multiplication circuit and to the high-power input terminal;
   3. an alternating current amplification circuit connected between said variable signal generating means and said input terminals of said first switching means; and
   4. conversion circuit means connected to said power input terminals and to said alternating current amplification means, and operative to convert alternating current power into direct current power.